(12) United States Patent
Perez-Sanchez

(10) Patent No.: US 7,484,694 B2
(45) Date of Patent: Feb. 3, 2009

(54) AIRCRAFT WING WITH EXTENDIBLE NOSE FLAP

(75) Inventor: Juan Perez-Sanchez, Feldkirchen-Westerham (DE)

(73) Assignee: Eads Deutschland GmbH, Ottobrunn (DE)

( * ) Notice: Subject to any disclaimer, the term of this patent is extended or adjusted under 35 U.S.C. 154(b) by 168 days.

(21) Appl. No.: 11/532,359

(22) Filed: Sep. 15, 2006

(65) Prior Publication Data
US 2009/0001224 A1    Jan. 1, 2009

(30) Foreign Application Priority Data
Sep. 17, 2005   (DE) .................. 10 2005 044 549

(51) Int. Cl.
*B64C 9/00* (2006.01)
(52) U.S. Cl. .............. 244/214; 244/210; 244/211; 244/212; 244/213; 244/214; 244/215; 244/216; 244/217
(58) Field of Classification Search ........... 244/210, 244/211, 22, 213, 214, 215, 216, 217
See application file for complete search history.

(56) References Cited

U.S. PATENT DOCUMENTS 7,063,292 B2 *  6/2006  Perez-Sanchez ............ 244/216

FOREIGN PATENT DOCUMENTS

DE          103 28 717 B3     12/2004

* cited by examiner

*Primary Examiner*—Michael R Mansen
*Assistant Examiner*—Valentina Xavier
(74) *Attorney, Agent, or Firm*—Greenblum & Bernstein, P.L.C.

(57) ABSTRACT

An aircraft wing including a wing box and a nose flap moveably connected to the wing box by first and second folding hinges. A first transverse link is pivotally connected to first portions of the first and second folding hinges. A second transverse link is pivotally connected to second portions of the first and second folding hinges. An actuator is connected diagonally between the first and second transverse links for moving the nose flap between a retracted position and an extended position. The instant abstract is neither intended to define the invention disclosed in the specification nor intended to limit the scope of the invention in any way.

19 Claims, 9 Drawing Sheets

AIRCRAFT WING WITH EXTENDIBLE NOSE FLAP

CROSS-REFERENCE TO RELATED APPLICATIONS

The present application claims priority under 35 U.S.C. §119 of German Patent Application No. 10 2005 044 549.7, filed on Sep. 17, 2005, the disclosure of which is expressly incorporated by reference herein in its entirety.

BACKGROUND OF THE INVENTION

1. Field of the Invention

The present invention relates to an aircraft wing with a wing box and at least one nose flap that is moveable, about a nose swivel axis lying crosswise to the incident flow and outside the wing structure, between a starting position bearing against the wing box and an operating position spaced in front of the wing box.

2. Discussion of Background Information

With almost all aircraft according to the prior art, extendible nose flaps on the aircraft wings are used to increase uplift, particularly in high angle of attack situations. Various embodiments of such flaps are known in the prior art, such as, for example, "droop nose flaps," "Kroger flaps" or "split nose flaps." Different forms and constructions of drives or bearings of extendible nose flaps of this type are also known. Spindle drives, rack and pinion drives, or slot roll guide drives are used for the flap guidance of split nose flaps. A problem exists in that, with the split nose flaps, the necessary path of motion cannot be represented as rotation about a support point located on the wing.

In some conventional systems, the extension movement of the nose flap relative to the wing is achieved by a combined translational and rotational motion. However, such systems have corresponding demands on the extension geometry of the actuating mechanism that must be met. Generally, these demands are met by way of a sliding guide in which a pair of rollers moves over a rail.

In other known systems, the required extending movement of the nose flap relative to the wing is made by a rotation of the flap about an axis lying crosswise to the incident flow and outside the wing structure. Such systems typically employ spindle drive rods. However, these systems with spindle drive rods are disadvantageous because they occupy considerable space in the direction of the wing structure. That is, the spindle drive rods usually extend far into the tank space accommodated in the wing structure, where they have to be blocked off from the tank space in a complex manner by pressure canisters. Furthermore, due to the length of the spindles, these systems generally have a high structural weight, which is unfavorable in aircraft.

An actuating device for a control flap arranged on the trailing edge of an aircraft wing is known from German Patent No. DE 103 28 717 B3, in which an actuating device comprising a pyramid transmission arrangement is used. In this system, the rotational axis for the control flap is spaced apart from the plane of the airfoil profile. However, the actuating device is complicated in its structural embodiment in that it has a plurality of moveable elements, a correspondingly large number of support points, and a resultant high structural weight. Furthermore, the drive of the actuating device occurs through a rotary control element that exerts an adjusting torque on swivel elements of the pyramid transmission. As a result, these elements must be embodied in a correspondingly solid manner, which has the undesired effect of increasing the structural weight of the system.

SUMMARY OF THE INVENTION

The present invention is directed to an aircraft wing with an extendible nose flap, which provides an improvement over known systems that cost too much in terms of space and weight. Implementations of the invention provide great variability regarding the extension path and the positioning of the nose flap relative to the fixed wing. Moreover, implementations of the invention comprise few moving parts, thereby facilitating ease of maintenance.

According to an embodiment of the invention, there is an aircraft wing with a wing box and at least one nose flap that is extendible from a starting position bearing against the wing box to an operating position spaced in front of the wing box. The nose flap is extendible about a nose flap swivel axis lying crosswise to the incident flow and outside the wing structure. The nose flap is pivoted on the wing box by at least two folding hinges spaced apart from one another crosswise to the incident flow. The folding hinges each comprise two hinge wings, which are connected via a common folding bearing so as to be pivoted with respect to one another. One hinge wing is attached to the wing box in a pivotable manner, and the other to the nose flap in a pivotable manner. The common folding bearing, the pivot bearing on the wing box side, and the pivot bearing on the nose flap side are arranged such that their respective pivot axes intersect at a common point on the nose flap pivot axis. The folding bearings of the spaced apart folding hinges are connected to one another in a pivoted manner by an upper transverse link at their upper ends and by a lower transverse link at their lower ends. The two transverse links and the two folding bearings form a parallelogram with variable angles. A diagonal link with variable length is connected in a pivotable manner to diagonally opposite pivot points of the transverse links.

Embodiments of the invention provide structural simplicity and the benefits associated therewith. For example, the extension mechanism for the nose flap is formed by two spaced apart folding hinges, each of which comprises two hinge wings. The drive of the extension mechanism may comprise a variable length diagonal link. In this manner, impairment of the space of the fixed wing box is omitted. Moreover, there is a considerable saving in structural weight with respect to known systems. Furthermore, high degrees of operational reliability and ease of maintenance are ensured by minimizing the moveable support points and the momentum occurring at such points.

In a first embodiment of an aircraft wing according to the invention, the hinge wings and their pivot axes are arranged such that the hinge wings adopt a flat position (i.e., angled at 180° relative to one another) in a plane lying in the incident flow of the aircraft wing when the nose flap is at maximum extension. In this highly stressed position, the torsional stress on the hinge wings is almost completely omitted, and only a low holding force needs to be applied from the drive element (i.e., the diagonal link with variable length).

In an implementation of the invention, an aircraft wing with plural nose flaps arranged next to one another comprises upper and lower transverse links respectively connected to adjacent upper and lower transverse links by jack stays. The actuating movement for a first of the plural nose flaps is transmitted in a simple manner through the jack stays to the adjacent nose flap for movement of the nose flaps in the same direction of rotation. In this manner, a single drive element simultaneously moves several nose flaps arranged next to one another.

In embodiments of the invention, the diagonal link is embodied as a rigid linear actuator. For example, the diagonal link as a whole may comprise a linear actuator, such as, for example, a fluid piston-cylinder unit. Such actuators are well known in the art and may be designed for any desired length and any desired actuating force.

It is advantageous, in terms of low structural weight, if the hinge wings are embodied as torsionally stiff and rigid framework structures. Moreover, the folding hinges, and the links connecting them, can be provided with an aerodynamic cover. The aerodynamic cover may cover the small spatial expansion of the folding hinges or the entire actuating mechanism for the extension of the nose flap.

In even further implementations of the invention, the bearing bracket for at least one rocker pivot on the wing box side is attached to the wing box so as to be pivoted in a limited manner about an axis lying essentially parallel to the incident flow. This is advantageous in the case of comparatively long nose flaps for very large aircraft wings with a correspondingly large wing span, because aircraft wings of this type bend to a certain degree during operation. Pivoting the rocker pivots on the wing box side in a limited manner avoids a bending of the extension mechanism with folding hinges that are spaced far apart.

In a first aspect of the invention, there is A system structured and arranged to move a nose flap between a retracted position in which the nose flap bears against a wing box of an aircraft wing and an extended position in which the nose flap is spaced in front of the wing box. The system comprises a first hinge wing pivotally connected to the wing box and a second hinge wing pivotally connected to the first hinge wing by a first folding bearing and pivotally connected to the nose flap. The system further comprises a third hinge wing pivotally connected to the wing box and a fourth hinge wing pivotally connected to the third hinge wing by a second folding bearing and pivotally connected to the nose flap. A first transverse link is pivotally connected to first portions of the first and second folding bearings. A second transverse link is pivotally connected to second portions of the first and second folding bearings. An actuator is arranged diagonally between the first and second transverse links.

The system may be arranged such that the first hinge wing and the third hinge wing are spaced apart from each other in a direction that is transverse to an incident flow outside the aircraft wing. Additionally, the second hinge wing and the fourth hinge wing may be spaced apart from each other in the transverse direction.

The system may further comprise a first pivot bearing having a first pivot axis that connects the first hinge wing to the wing box and a second pivot bearing having a second pivot axis that connects the second hinge wing to the nose flap. The first pivot axis, the second pivot axis, and a pivot axis of the first folding bearing intersect at a point. Furthermore, the point may lie on a nose flap pivot axis about which the nose flap rotates between the retracted and extended positions. Even further, the nose flap pivot axis may be located outside the aircraft wing and oriented crosswise relative to an incident flow outside the aircraft wing.

The system may be arranged such that the first transverse link, the second transverse link, the first folding bearing, and the second folding bearing form a parallelogram with variable angles. The first, second, third, and fourth hinge wings may comprise torsionally stiff and rigid framework structures. The actuator may comprise a linear actuator that is extendible and retractable, such as, for example, a fluid piston-cylinder unit.

The system may further comprise an aerodynamic cover arranged to cover portions of the first, second, third, and fourth hinge wings. The system may be arranged such that, in the extended position, the first and second hinge wings are arranged in a plane that lies in a flow incident to the aircraft wing.

The system may include a second nose flap connected by a first jack stay to the first transverse link and a second jack stay to the second transverse link. In this manner, the second nose flap may be caused to move in a same direction of rotation as the nose flap.

Lastly, the system may further include a bearing bracket to which the first hinge wing is pivotally connected and which is pivotally connected to the wing box about an axis that is essentially parallel to incident flow.

In a second aspect of the invention, there is provided an aircraft wing, comprising a wing box and a nose flap moveably connected to the wing box by first and second folding hinges. A first transverse link is pivotally connected to first portions of the first and second folding hinges. A second transverse link pivotally connected to second portions of the first and second folding hinges. An actuator is arranged diagonally between the first and second transverse links for moving the nose flap between a retracted position and an extended position. The first folding hinge may comprise three pivot axes that intersect at a point outside the aircraft wing.

In a third aspect of the invention, there is a method of extending and retracting a nose flap connected to a wing box by first and second folding hinges that are spaced apart in a direction transverse to incident flow. The method includes adjusting a length of a linear actuator diagonally connected between corners of a parallelogram formed by a first transverse link, a second transverse link, and portions of the first and second folding hinges.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
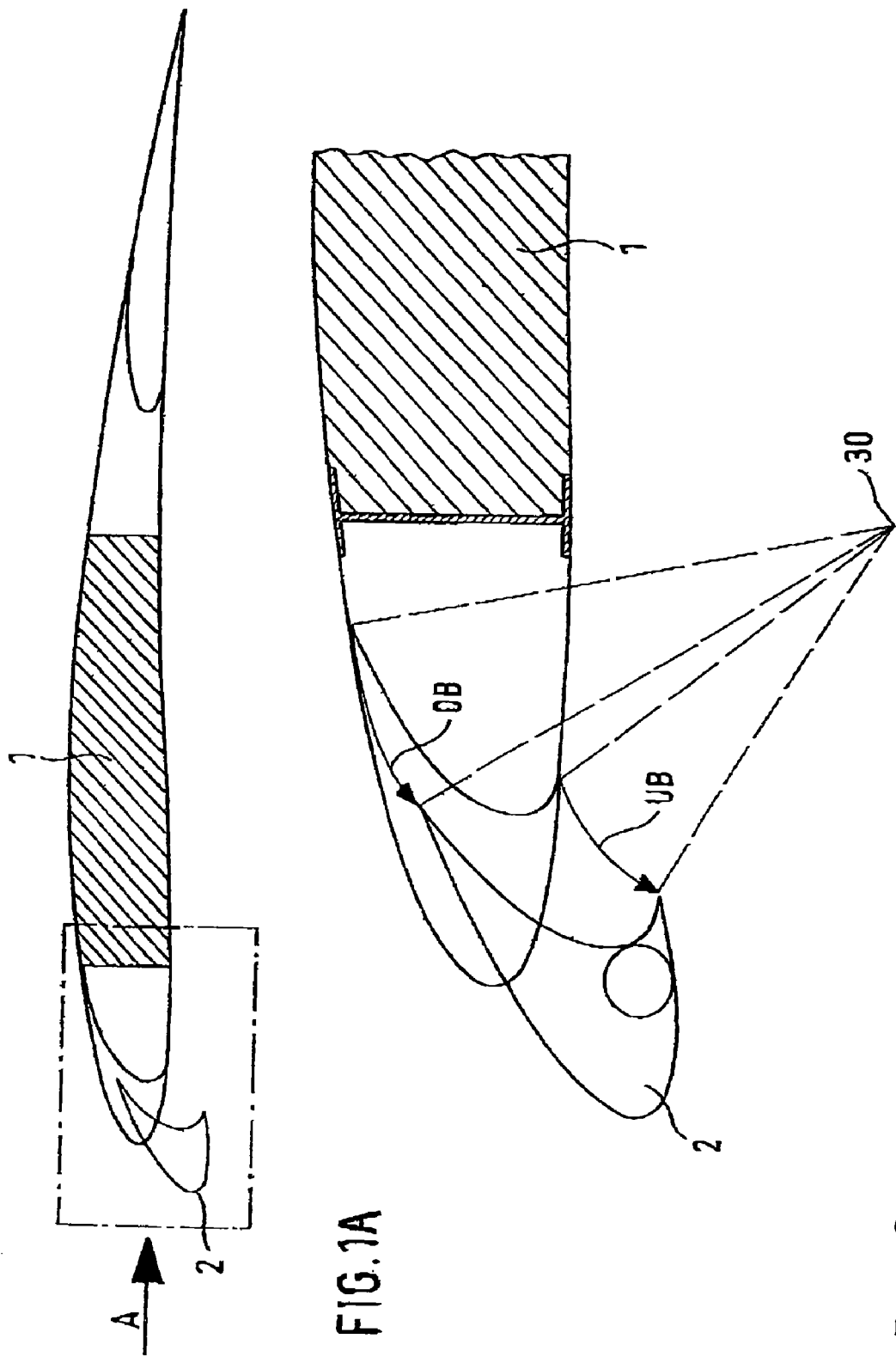
FIGS. 1A and 1B show a longitudinal view of an aircraft wing with wing box and extendible nose flap, with rotational axis lying outside the wing structure.

An aircraft wing with extendible nose flap 2 is shown diagrammatically in cross section in FIG. 1A. The fixed part of the wing is labeled wing box 1, and the incident flow is labeled A. FIG. 1B shows an enlargement of the section of the aircraft wing shown by a dash-dot line in FIG. 1A. The wing box 1, in which fuel tanks are usually accommodated, is separated from the nose area of the wing by a bulkhead wall. In addition to the nose flap 2, motion arrows are depicted for an upper motion path OB and a lower motion path UB. These motion arrows show how the nose flap 2 moves between retracted and extended positions on circular arcs around a nose flap pivot axis 30 that lies below the wing structure.

Figure 2:
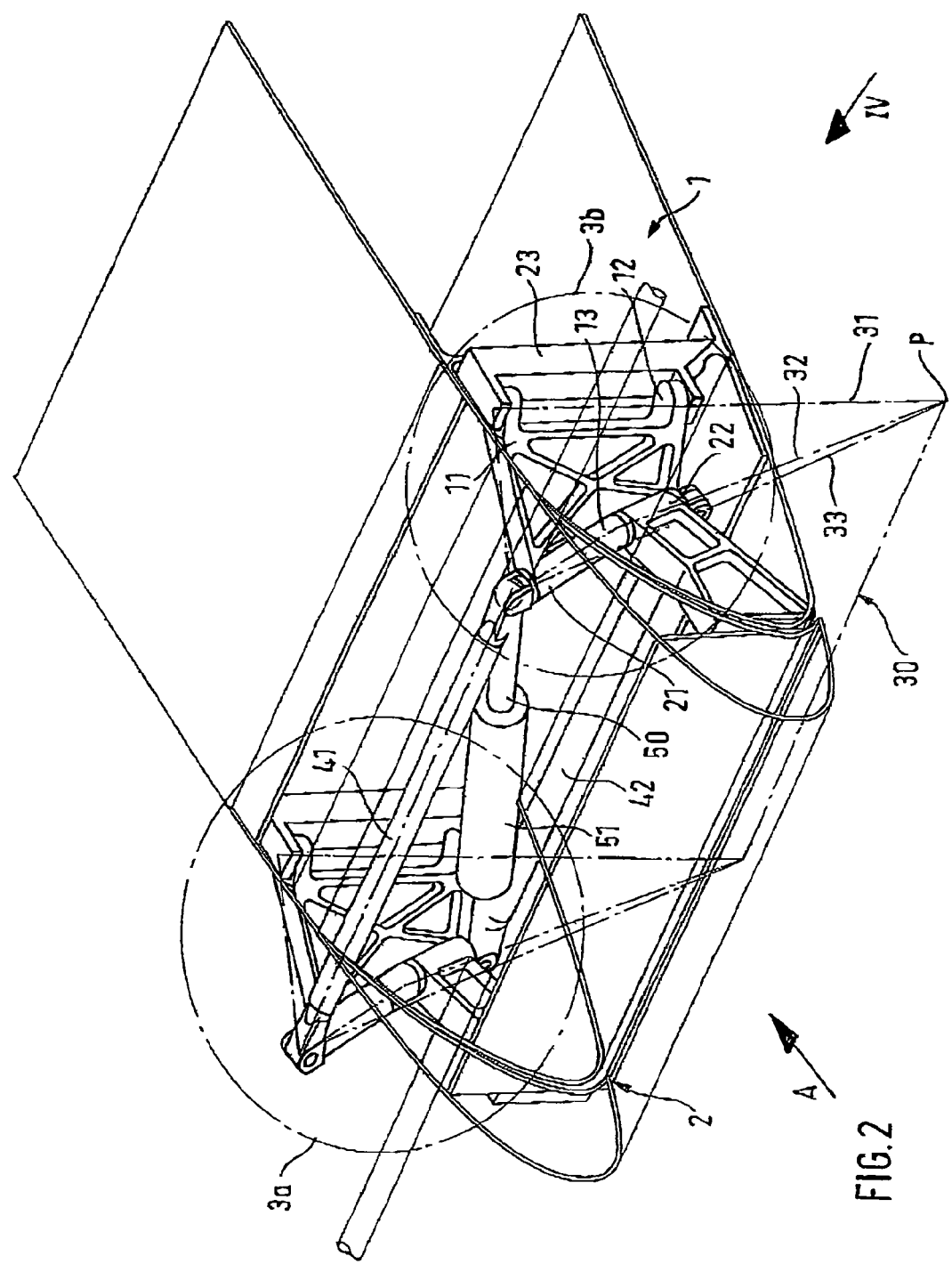
FIG. 2 shows an oblique projection in diagrammatic form of the front area of an aircraft wing according to FIGS. 1A and 1B with a nose flap hinged according to the invention, whereby the nose flap bears against the wing box.

The mechanism for extending the nose flap 2 is shown in the oblique projection according to FIG. 2, which shows the nose flap in the retracted position bearing against the wing box 1. The nose flap 2 is hinged on the wing box 1 by two folding hinges 3a and 3b that are spaced apart from one another crosswise to the incident flow A. To aid understanding, the folding hinges 3a and 3b are shown surrounded by dash-dot circles. The folding hinges 3a and 3b are embodied identically, so that the description of the design can be limited to one folding hinge. Each folding hinge 3a (or 3b) comprises two hinge wings 11, 21. The hinge wings 11, 21 are mounted to be pivoted to one another via a common folding bearing 13. One hinge wing 11 is hinged on the wing box 1 in pivot bearings 12 via a bearing bracket 23. The pivot axis 31 of the pivot bearing 12 is aligned essentially vertically. The second hinge wing 21 is hinged in a pivoting manner on a pivot bearing 22 of a bracket of the nose flap. Pivot bearing 22 has a corresponding pivot axis 32 (more readily discernible in FIG. 3). The pivot bearing 12 and the pivot bearing 22 are aligned such that the pivot axes 31 and 32 intersect at a point "P" on the nose pivot axis 30 lying outside the wing structure. The pivot axis 33 of the folding bearing 13 must also run through this joint intersection point "P". The hinge wings 11 and 21 are embodied as torsionally stiff and rigid framework structures.

Figure 5:
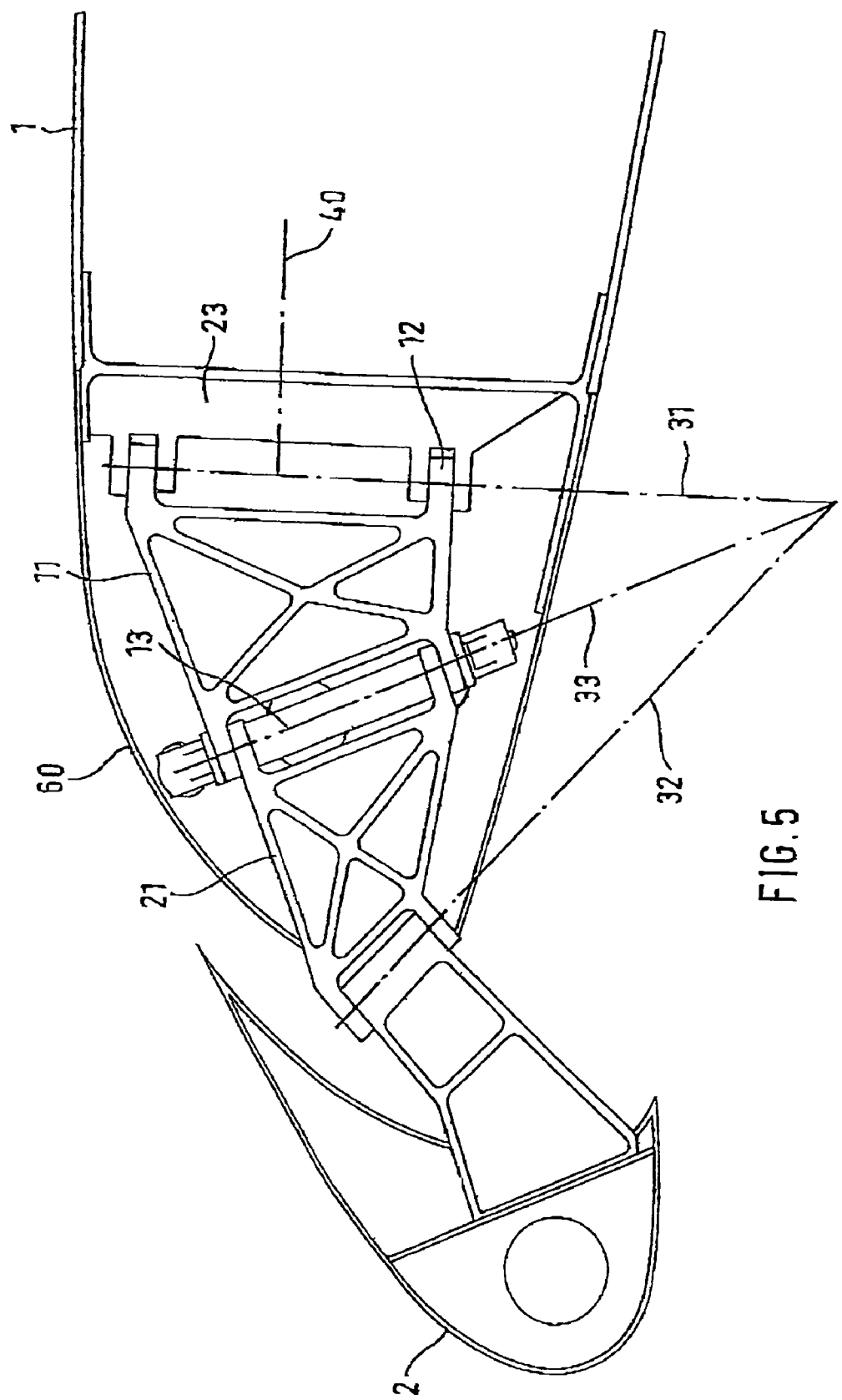
FIG. 5 shows a side view according of the arrangement according to FIG. 3 in the direction of arrow IV.
Figure 6:
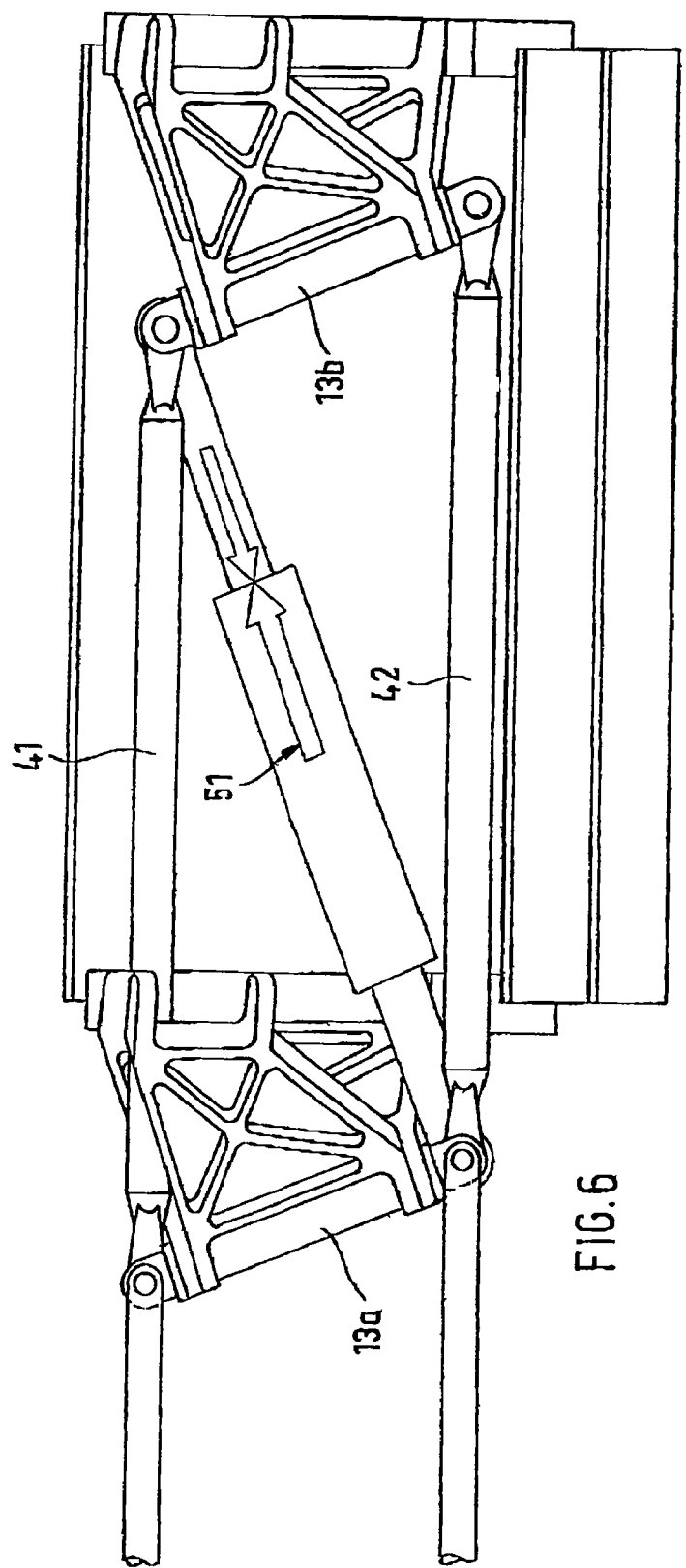
FIG. 6 shows the arrangement according to FIG. 2 in front view, whereby only the adjustment mechanism with two folding hinges and the actuating parallelogram formed by transverse link and diagonal link are shown.
Figure 7:
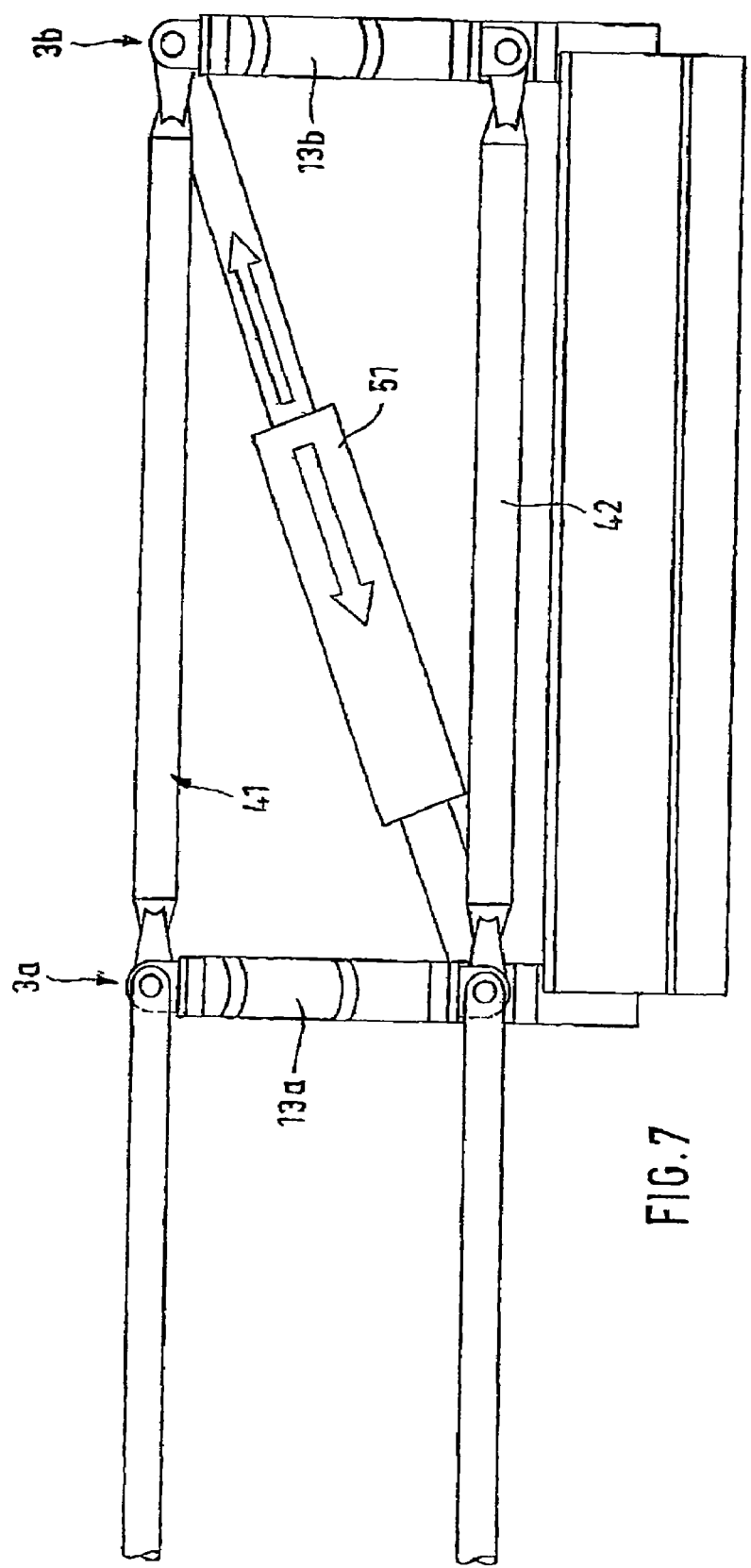
FIG. 7 shows a view according to FIG. 6, but with the nose flap extended.

As best seen in FIGS. 6 and 7, the upper ends of the folding bearings 13a, 13b (previously collectively referred to as 13 with respect to FIGS. 2-5) of the folding hinges 3a, 3b are connected in a pivoted manner to an upper transverse link 41. Likewise, the lower ends of the folding bearings 13a, 13b of the folding hinges 3a, 3b are connected to one another in a pivoted manner with a lower transverse link 42. The two transverse links 41, 42 and the two folding bearings 13a, 13b form a parallelogram with adjustable angles. In this parallelogram, an adjustable length diagonal link 50 is connected in a pivoted manner to diagonally opposite pivot points of the transverse links 41, 42. In embodiments, the adjustable length diagonal link 50 comprises a rigid linear actuator 51.

In the retracted position shown in FIG. 2, the nose flap 2 bears against a surface profile (e.g., cover 60) of the wing box 1. In this retracted position, the folding hinges 3a, 3b are in their most folded up condition and the linear actuator 51 has its shortest length.

Figure 3:
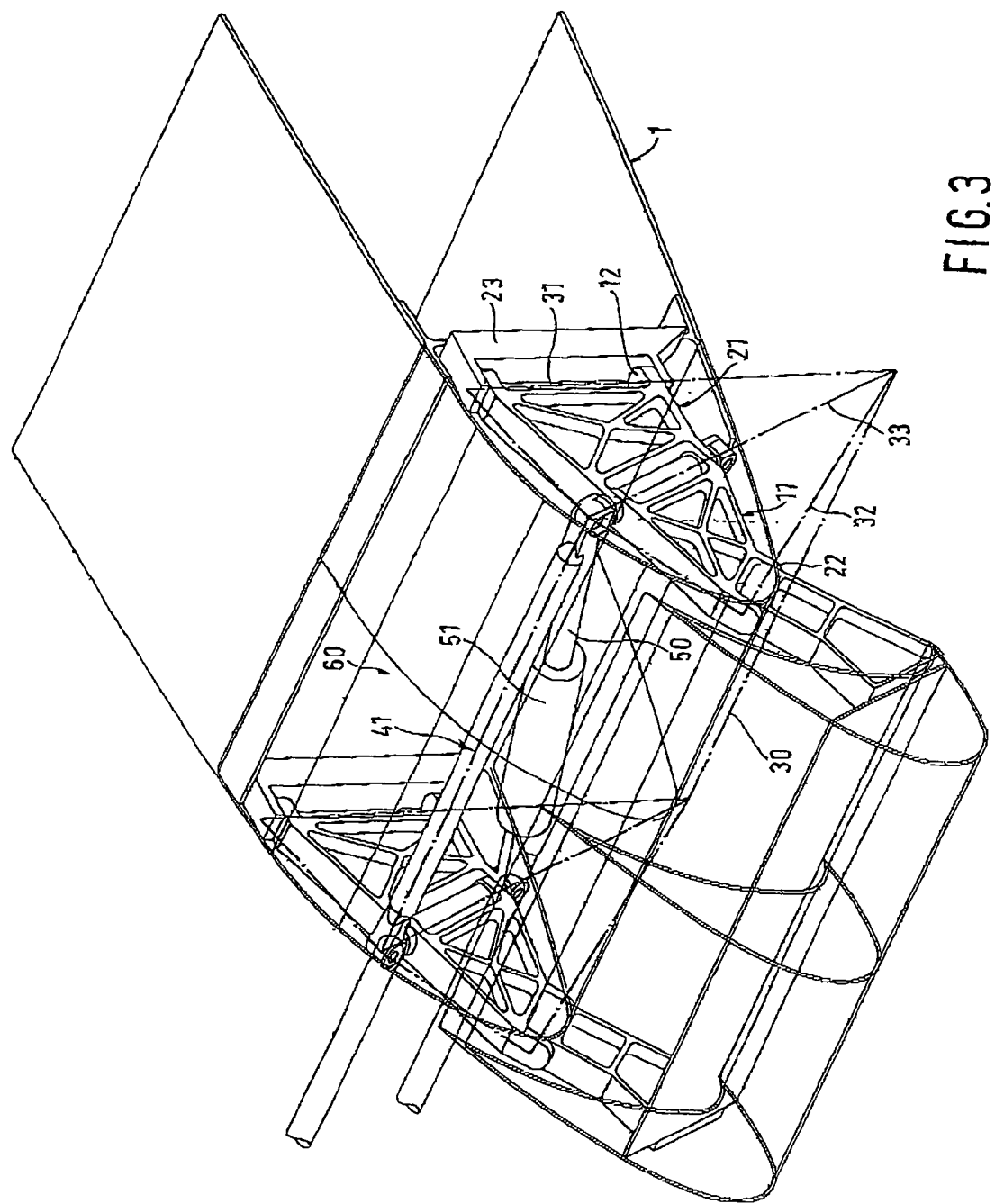
FIG. 3 shows an oblique projection according to FIG. 2, whereby the nose flap is extended in an operating position at a distance in front of the wing box.

Through the extension of the linear actuator 51 to its maximum length, the folding hinges 3a, 3b move into the fully opened up position (i.e., 180° relative to each other) shown in FIG. 3. In this manner, the nose flap 2 moves into its extended position with a maximum distance from the wing box 1. The nose flap 2 moves between the retracted and extended positions according to the diagrammatic motion directions OB and UB from FIG. 1B. The hinge wings 11, 21 thereby perform swivel movements about pivot axes 32 and 31 and swivel against one another about pivot axis 33. In the extended position, the parallelogram formed by the folding bearings 13a, 13b of the folding hinges 3a, 3b and by the upper transverse link 41 and the lower transverse link 42 takes on the shape a rectangle, as shown, for example, in FIG. 7.

Figure 4:
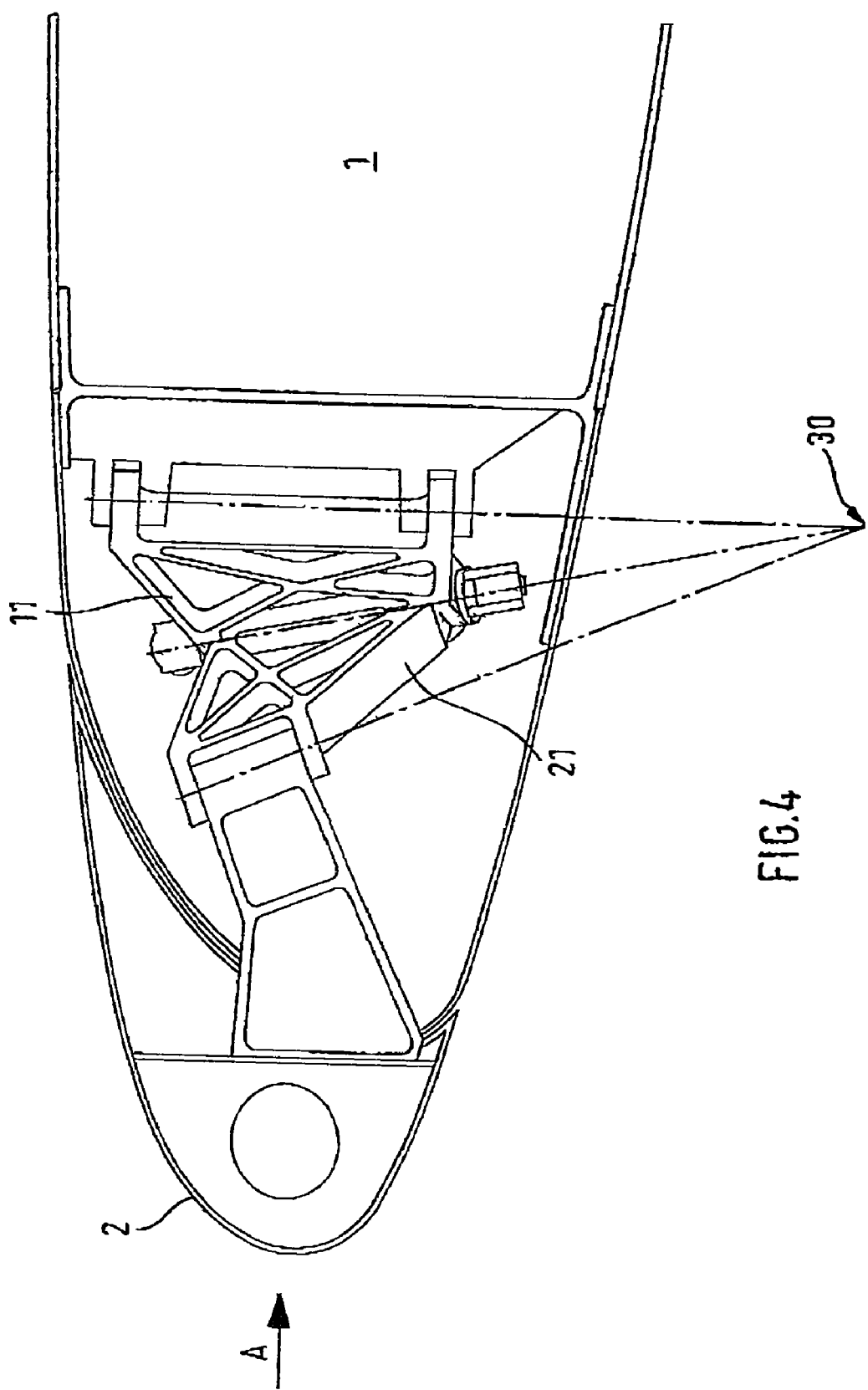
FIG. 4 shows a side view of the wing section according to FIG. 2 in the direction of arrow IV.

The unfolding of the folding hinges 3a, 3b is depicted in the side views of FIG. 4 (i.e., retracted position) and FIG. 5 (i.e., extended position). To protect the actuating mechanism and to avoid uncontrolled flows, the folding hinges 3a, 3b, and the links connecting them, are provided with an aerodynamic cover 60, the profile of which is adapted to the inner profile of the nose flap 2.

Figure 8:
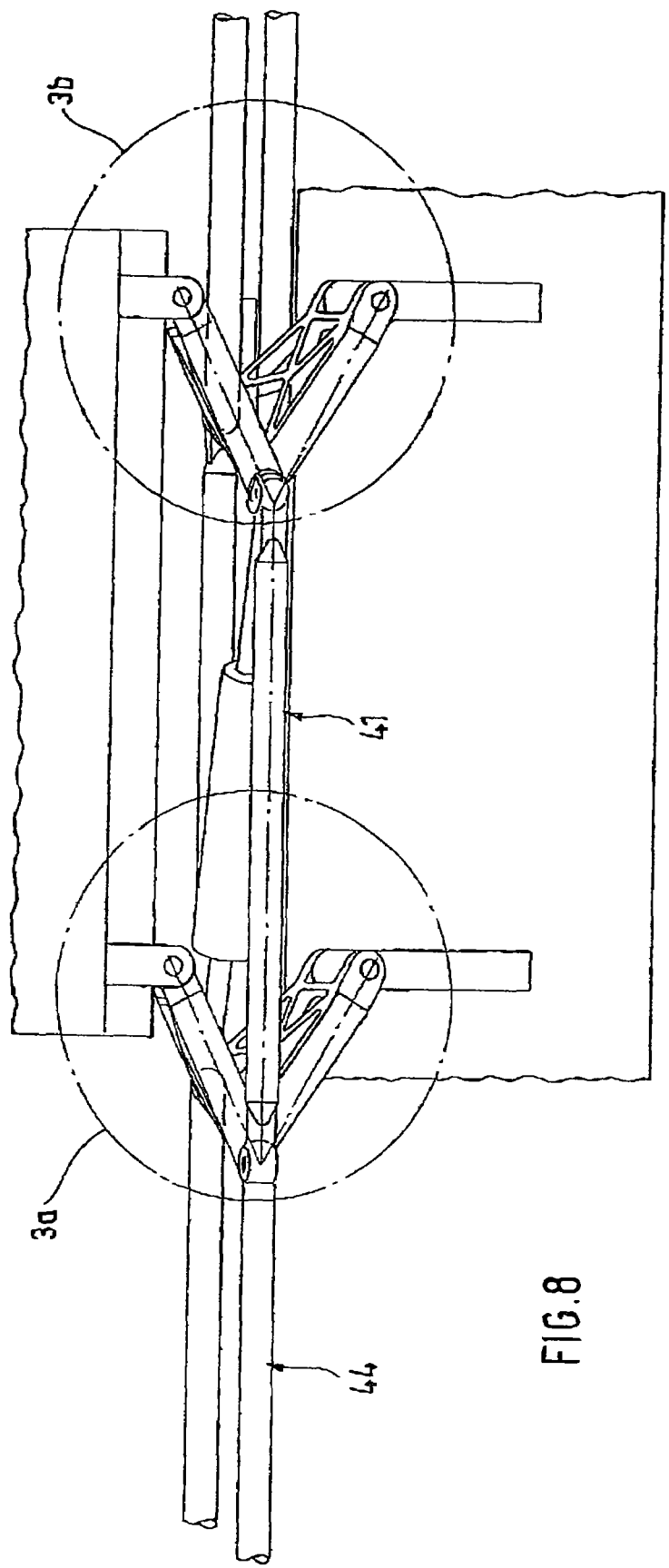
FIG. 8 shows an arrangement according to FIG. 6 in plan view.

FIG. 8 shows a plan view of the adjustment mechanism in which the nose flap is in the fully retracted state. An optional jack stay 44 is provided that leads to an optional adjacent adjustment device for an optional adjacent nose flap.

Figure 9:
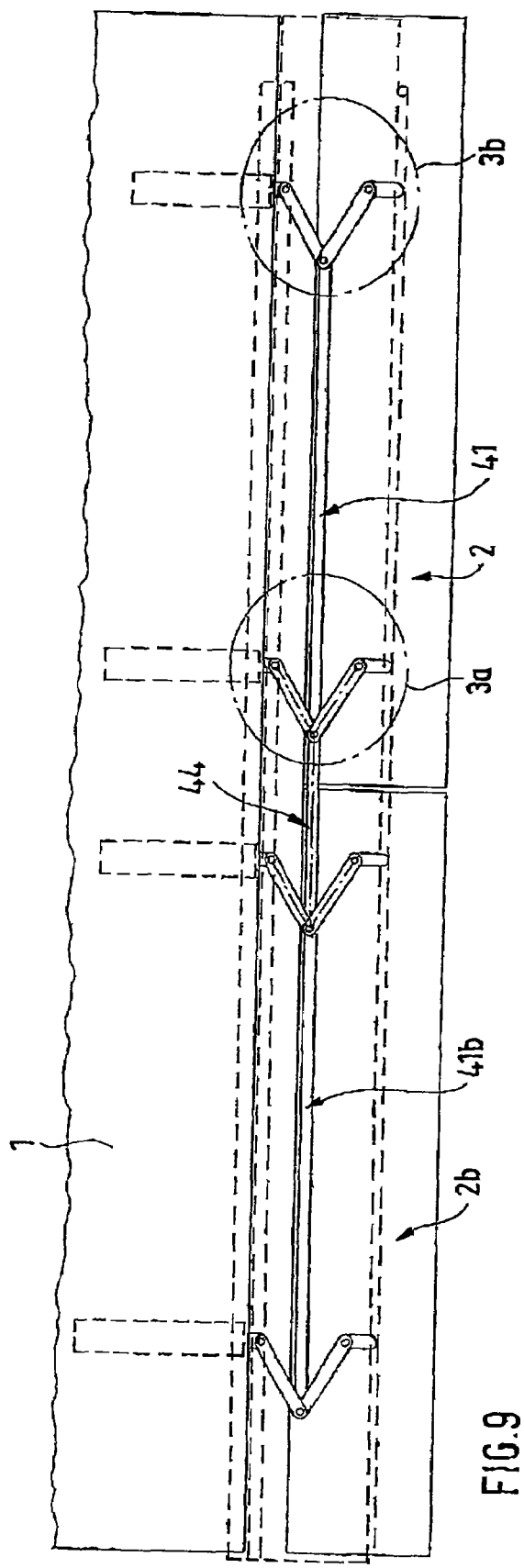
FIG. 9 shows an aircraft wing, in which a second nose flap is adjacent to and adjustable in the same direction of rotation as a first nose flap.

FIG. 9 shows an implementation of the invention having two adjacent nose flaps, in which the second nose flap is denoted by 2b. Two spaced apart folding hinges (which are not shown in further detail in FIG. 9) are provided for the second nose flap 2b, and correspond to the folding hinges 3a, 3b for the nose flap 2. In the embodiment shown, the upper transverse link 41 for the nose flap 2 is connected to the upper transverse link 41b for the second nose flap 2b by a jack stay 44. Similarly, the lower transverse links 42 are connected to a jack stay, whereby movement of the nose flaps 2, 2b in the same direction of rotation is ensured. With this arrangement, it is possible to move both nose flaps 2, 2b with a single drive (e.g., linear actuator 51) of the nose flap 2. Alternatively, a central linear actuator 51 may be arranged in the parallelogram formed by the nose flap 2, second nose flap 2b, and jack stays 44, whereby actuation of the nose flaps 2, 2b takes pace between the nose flaps 2, 2b with the central linear actuator 51.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A system structured and arranged to move a nose flap between a retracted position in which the nose flap bears against a wing box of an aircraft wing and an extended position in which the nose flap is spaced in front of the wing box, comprising:
   a first hinge wing pivotally connected to the wing box;
   a second hinge wing pivotally connected to the first hinge wing by a first folding bearing and pivotally connected to the nose flap;
   a third hinge wing pivotally connected to the wing box;
   a fourth hinge wing pivotally connected to the third hinge wing by a second folding bearing and pivotally connected to the nose flap;
   a first transverse link pivotally connected to first portions of the first and second folding bearings;
   a second transverse link pivotally connected to second portions of the first and second folding bearings; and
   an actuator arranged diagonally between the first and second transverse links.

2. The system of claim 1, wherein the first hinge wing and the third hinge wing are spaced apart from each other in a direction that is transverse to an incident flow outside the aircraft wing.

3. The system of claim 2, wherein the second hinge wing and the fourth hinge wing are spaced apart from each other in the transverse direction.

4. The system of claim 1, further comprising:
   a first pivot bearing having a first pivot axis that connects the first hinge wing to the wing box; and
   a second pivot bearing having a second pivot axis that connects the second hinge wing to the nose flap,
   wherein the first pivot axis, the second pivot axis, and a pivot axis of the first folding bearing intersect at a point.

5. The system of claim 4, wherein the point lies on a nose flap pivot axis about which the nose flap rotates between the retracted and extended positions.

6. The system of claim 5, wherein the nose flap pivot axis is located outside the aircraft wing and oriented crosswise relative to an incident flow outside the aircraft wing.

7. The system of claim 1, wherein the first transverse link, the second transverse link, the first folding bearing, and the second folding bearing form a parallelogram with variable angles.

8. The system of claim 1, wherein the first, second, third, and fourth hinge wings comprise framework structures.

9. The system of claim 1, wherein the first, second, third, and fourth hinge wings comprise torsionally stiff and rigid framework structures.

10. The system of claim 1, wherein the actuator comprises a linear actuator.

11. The system of claim 10, wherein the linear actuator is extendible and retractable.

12. The system of claim 10, wherein the linear actuator comprises a fluid piston-cylinder unit.

13. The system of claim 1, further comprising an aerodynamic cover arranged to cover portions of the first, second, third, and fourth hinge wings.

14. The system of claim 1, wherein, in the extended position, the first and second hinge wings are arranged in a plane that lies in a flow incident to the aircraft wing.

15. The system of claim 1, further comprising a second nose flap connected by a first jack stay to the first transverse link and a second jack stay to the second transverse link.

16. The system of claim 15, wherein the second nose flap moves in a same direction of rotation as the nose flap.

17. The system of claim 1, further comprising a bearing bracket to which the first hinge wing is pivotally connected and which is pivotally connected to the wing box about an axis that is essentially parallel to incident flow.

18. An aircraft wing, comprising:
   a wing box;
   a nose flap moveably connected to the wing box by first and second folding hinges;
   a first transverse link pivotally connected to first portions of the first and second folding hinges;
   a second transverse link pivotally connected to second portions of the first and second folding hinges; and
   an actuator connected diagonally between the first and second folding hinges for moving the nose flap between a retracted position and an extended position.

19. The aircraft wing of claim 18, wherein the first folding hinge comprises three pivot axes that intersect at a point outside the aircraft wing.

* * * * *